United States Patent

Phillips

[19]

[11] 3,876,230

[45] Apr. 8, 1975

[54] FOLDABLE CAMPER STEP ASSEMBLY

[76] Inventor: Charlie E. Phillips, 7226 N. Fiske, Portland, Oreg. 97203

[22] Filed: Apr. 1, 1974

[21] Appl. No.: 456,791

[52] U.S. Cl. .............................................. 280/166
[51] Int. Cl. ............................................. B60r 3/02
[58] Field of Search ............ 280/166, 164; 105/447; 182/95, 96

[56] References Cited
UNITED STATES PATENTS

| | | | |
|---|---|---|---|
| 1,193,466 | 8/1916 | Mealer | 105/447 |
| 3,507,515 | 4/1970 | Brammer | 280/166 |
| 3,627,350 | 12/1971 | Cross | 280/166 |
| 3,807,757 | 4/1974 | Carpenter | 280/166 |

*Primary Examiner*—Robert R. Song
*Attorney, Agent, or Firm*—Chernoff & Vilhauer

[57] ABSTRACT

A foldable step assembly for use with a camper of the type usually carried on the bed of a pick-up truck. An assembly of pivotally interconnected steps adapted to be attached at its top to the bumper of the pick-up truck or camper normally extends downwardly for access to the door of the camper, but may be compactly folded up above the bumper and locked into place during transport thereby blocking the camper door so that it will not swing open. In the unfolded position the bottom two steps of the assembly can freely swing rearwardly and upwardly to move over obstacles if inadvertently left unfolded while the camper is moving.

13 Claims, 5 Drawing Figures

PATENTED APR 8 1975 3,876,230

FOLDABLE CAMPER STEP ASSEMBLY

BACKGROUND OF THE INVENTION

This invention relates to foldable steps for use with campers.

The threshold of the doorway to such campers is typically very high above the ground, particularly when the truck is equipped with extra-large tires to increase its traction and ground clearance. Accordingly access to the doorway is usually quite difficult. While a bumper on the truck or on the camper itself may be used as a step, its top surface may also be relatively high above the ground. A series of steps permanently attached to the camper or the truck extending below the bumper to permit easy access would be impractical, since they would decrease the effective clearance of the vehicle. What is needed therefore is a series of steps which extends below the bumper when the camper is parked but can be placed out of the way during transport. Another problem which arises in the use of campers is that the camper door is sometimes inadvertently left unlatched, or the forces exerted during transport cause the latch to fail, and the camper door opens spilling any loose contents or at least causing annoying banging by the freeswinging door. Thus it would be additionally advantageous to utilize a foldable series of steps to block the camper door during transport.

Strube U.S. Pat. No. 3,394,947, issued July 30, 1969, shows a pair of steps mounted to the rear bumper of a truckmounted camper so that they can be unfolded to extend below the bumper for access to the camper door and folded above the bumper for blocking the camper door during transport. However, this particular construction only provides two steps and could not provide the structural support for three without substantial modification. Furthermore, the means for locking the pair of steps in a folded position requires attaching a hook and tightening a wing nut which is relatively complicated and inconvenient. Also a foldable support runs upwardly from the top surface of the bottom step, presenting a possible obstacle to the user.

A foldable camper step assembly shown in Smith et al U.S. Pat. No. 3,462,170, issued Aug. 19, 1969, is adapted to be attached to the tail gate of the pick-up truck upon which a camper is mounted. This step construction does not aid in blocking the door of the camper since the door is blocked by the tail gate itself when it is raised during transport, and the steps would be impractical for use with any camper which extends beyond the rear end of the truck bed as many modern campers do. Furthermore the steps must rest at their lower end on the ground in order to support any weight, which can be inconvenient if the ground is not level.

A third representative series of retractable steps for use with a camper is disclosed in Aldropp et al U.S. Pat. No. 3,645,557, issued Feb. 29, 1972, wherein two steps are retractably attached to the underside of a structural component at the rear of the camper or truck immediately beneath the doorway. While this effectively provides three steps if the assembly is attached to a bumper whose surface may be used as the top step, the net result will be an awkward arrangement if the bumper to which the assembly is attached is very thick, since the distance between the top step and the middle step will be much greater than the distance between the middle step and the bottom step. Since the steps slide underneath a structural component, presumably a bumper, they cannot be used to block the door of the camper and they would effectively decrease the clearance of the rear of the truck. Also, the combinatiton of a number of folding maneuvers and a sliding maneuver in order to put these steps away for transport is relatively complicated.

SUMMARY OF THE PRESENT INVENTION

The present invention overcomes the disadvantages of the prior art camper steps by utilizing a series of step members of sturdy construction adapted to be mounted to the bumper of a pick-up truck or camper and pivotally interconnected to extend downwardly for access to the threshold of the camper doorway without support from the ground. The step members may be compactly folded upwardly above the bumper and automatically located in place by a simple maneuver so as to block the camper door during transport.

A top step having a vertical support extending downwardly therefrom is secured to the bumper of the pick-up truck or camper. In its unfolded position, a middle step hangs from an arm connected to the aforesaid downwardly extending support, and a bottom step hangs from a similar support on the middle step. Both the bottom and middle steps are pivotally connected to the next higher step such that they may swing upwardly but not downwardly from the unfolded position. In their raised folded positions the bottom and middle steps rest above the top step and are compactly folded so that the bottom step is tucked between the top and middle steps while the middle step extends upwardly blocking the camper door. As a result of the following maneuver the arm by which the middle step normally hangs in its unfolded position moves downwardly under the influence of gravity through a slotted pivotal connection by which it is attached to the top step, such slotted connection thereby locking the bottom and middle steps in their folded positions.

It is therefore a principal objective of the present invention to provide a novel, easily foldable step assembly for use with a camper, such assembly requiring no ground support when in its unfolded operative position.

It is a further objective to provide a series of foldable steps which will automatically lock into a compact folded position by a relatively simple folding maneuver.

It is a further objective to provide a series of foldable steps which block the camper door in their folded position to prevent the camper door from inadvertently swinging open during transport.

It is a still further objective to provide a foldable step assembly which will pivot rearwardly and upwardly when unfolded so as to move over obstacles in its path if the vehicle is moving.

The foregoing and other objectives, features, and advantages of the present invention will be more readily understood upon consideration of the following detailed description of the invention taken in conjunction with the accompanying drawings.

DETAILED DESCRIPTION OF THE PREFERRED EMBODIMENT

Figure 1:
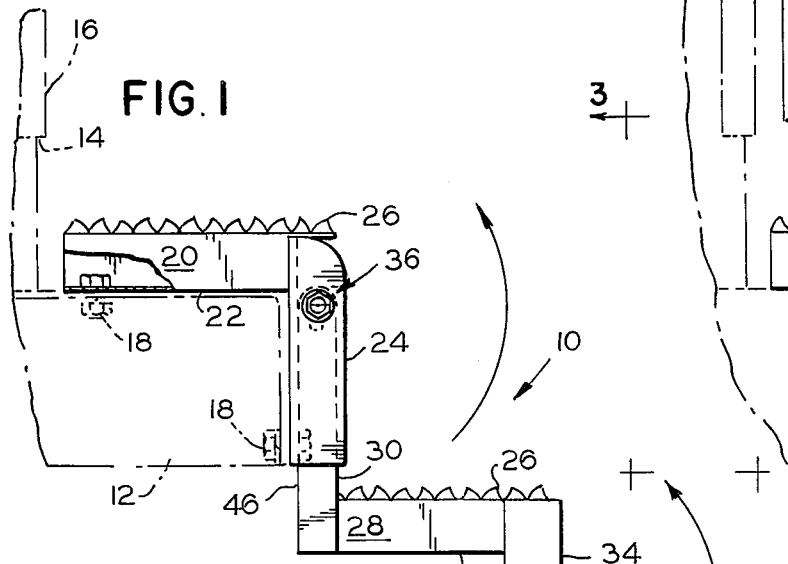
FIG. 1 is a side view of the camper step assembly shown in its unfolded operative position mounted on a bumper.
Figure 4:
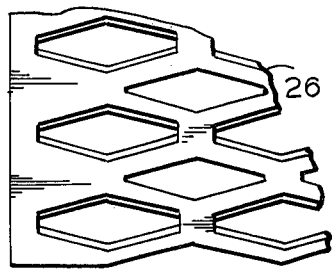
FIG. 4 is a detail view of a portion of the top surface of a typical step.
Figure 3:
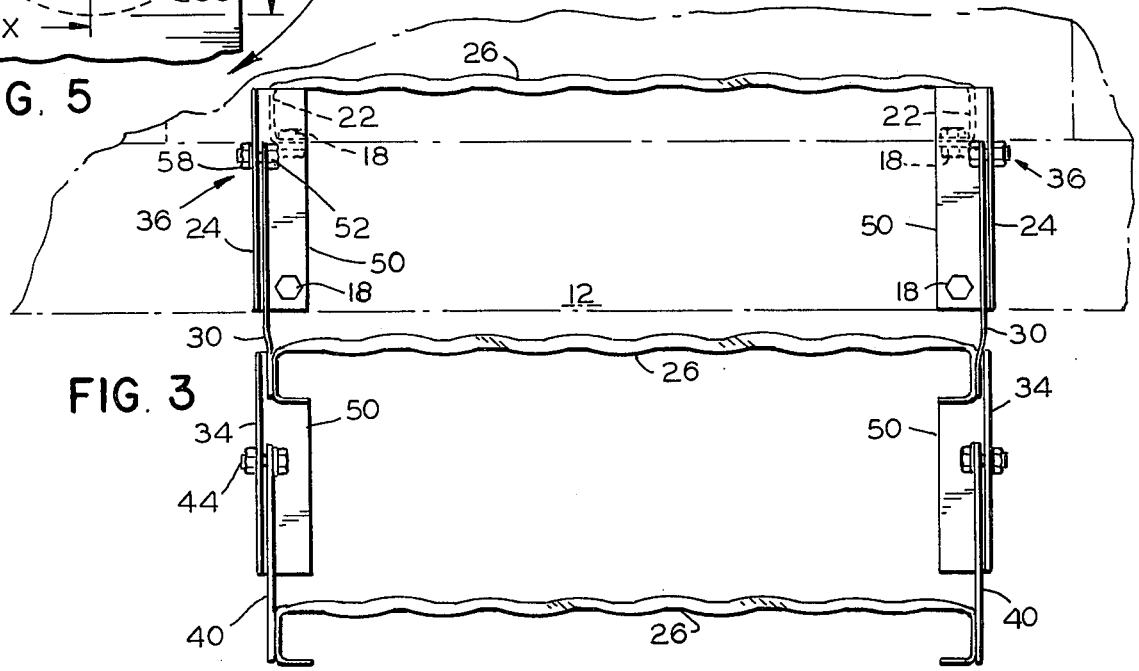
FIG. 3 is a rear view of the camper steps taken along line 3—3 of FIG. 1.

Referring to FIG. 1, the camper step assembly 10 is adapted to be mounted to the rear bumper 12 of the camper-carrying vehicle, typically a pick-up truck, in a position below the threshold 14 of the camper doorway 16 by appropriate fasteners such as bolts 18, also shown in FIG. 3. A top step 20, comprising a horizontal frame member 22 having a non-skid surface 26 and a pair of depending L-shaped supports 24 attached thereto, is mounted directly to the bumper 12 by the bolts 18. A middle step 28, comprising a horizontal frame member 32 having a non-skid surface 26 and a pair of depending L-shaped supports 34, hangs from the top step 20 by means of a pair of pivot arms 30 which are pivotally attached to their respective supports 24 by respective slotted, locking pivot assemblies 36 to be described hereafter in detail. The bottom step 38, comprising a frame member 42 having a non-skid surface 26, hangs from the middle step 28 by a pair of pivot arms 40 which are pivotally attached to the supports 34 by bolts 44. The top, middle, and bottom steps respectively may be fabricated by any appropriate method such as welding, and the non-skid surfaces 26 are preferably made of some appropriate material such as expanded metal as illustrated in FIG. 4.

Figure 2:
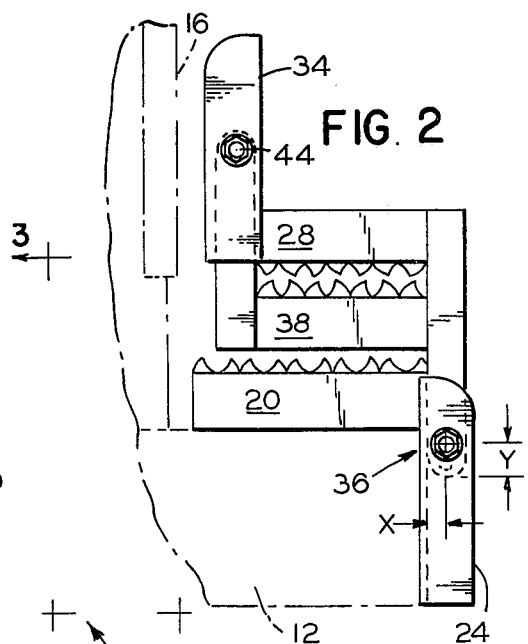
FIG. 2 is a side view of the step assembly shown in its folded position.

In their unfolded positions as shown in FIG. 1, the middle and bottom steps 28 and 38 are constrained against pivoting forwardly or downwardly by the forward edges 46 of the pivot arms 30 and 40 respectively resting against the inwardly projecting portions 50 of the L-shaped supports 24 and 34. On the other hand, the middle and bottom steps are free to pivot upwardly until they reach their folded positions as shown in FIG. 2. Accordingly, if the vehicle to which the step assembly is mounted moves forward while the steps are unfolded, the steps can pivot upwardly and slide over any obstacle they encounter.

In the assembly's folded position, as shown in FIG. 2, the top step 20 is in the same position as when the steps are unfolded since it is immovably mounted to the bumper 12. However, the middle step 28 rests upside-down above the top step with the support 34 projecting upwardly, while the bottom step 38 is tucked between the middle step and the top step. Because it projects upwardly in front of the camper door 16 when folded, the middle step blocks the door and prevents it from swinging open.

Figure 5:
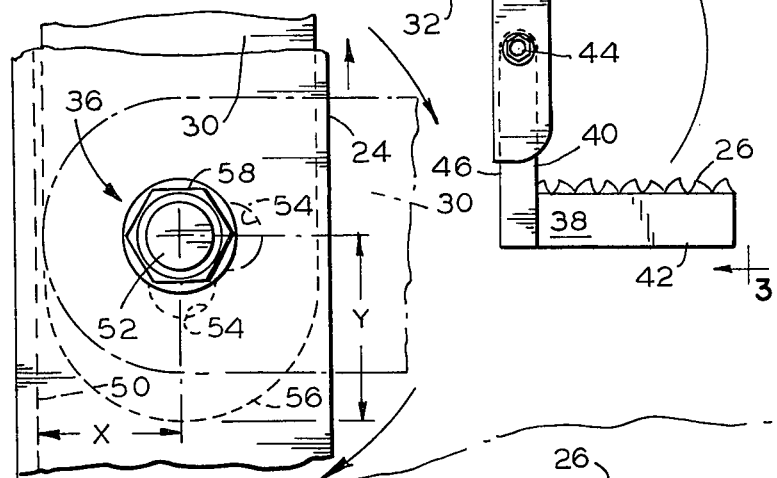
FIG. 5 is a side detail view of the slotted locking pivot of the step assembly, showing a transient moved position in phantom.

The bottom and middle steps are locked in their folded positions by the slotted pivot assemblies 36. Each slotted pivot assembly 36, shown in detail in FIG. 5, comprises a rod-like axle member such as a bolt 52 mounted laterally in the L-shaped support 24 and an elongated slot 54 formed in the respective pivot arm 30, such slot having rounded ends and being adapted to fit around the bolt so as to slide and pivot freely thereon. The bolt 52 is secured by a nut 58 to the support 24. One rounded end of the slot 54 is positioned sufficiently close to the rounded upper end of the arm 30 that, when the bolt 52 is positioned at that end of the slot the arm 30 may pivot about the bolt 52 without the upper end of the arm binding against the inwardly projecting portion 50 of the L-shaped support 24. Thus the pivot arm 30 is able to rotate upwardly for folding. However, once in the folded position, gravity pulls down on the arm 30 and shifts the slot downwardly so that the bolt 52 rides in the opposite end of the slot. In this position the distance Y from the axis of bolt 52 to the rounded end of the pivot arm 30 is greater than the distance X from the axis of bolt 52 to the rear surface of the inwardly projecting portion 50 of support 24. Thus the pivot arm 30 is unable to rotate downwardly since its rounded end would bind against the portion 50. Lifting up on the middle step 28 pulls the pivot arm 30 up so that the bolt 52 once more rides in the first end of the slot 54, which reduces the distance Y from the axis of the bolt to the rounded end of the pivot arm so that it is less than the distance X. This permits the pivot arm 30 to be rotated downwardly since its upper end will no longer bind against the portion 50. Thus the pivot arm can be lifted and rotated as illustrated by the moved phantom position in FIG. 5.

The steps would be unfolded when the carrying vehicle is parked and the camper is in use so that a person has a series of three steps to climb to enter the camper. (Alternatively, the apparatus could be manufactured with only two steps 20 and 28 if three are not needed). For transport of the vehicle, the steps would be folded up as shown by the arrows in FIG. 1. This can be accomplished by first rotating the bottom step 38 counterclockwise until it is upside down above the middle step 28, then rotating the middle step also in a counterclockwise direction until both are above the top step, and finally permitting the middle and bottom steps to drop slightly so that the pivot arm 30 will lock into position. To unfold the steps the opposite procedure is followed. The location of the pivot bolts 44 which couple the middle and bottom steps should be such as to prevent binding between the expanded metal surfaces of the two steps when such surfaces face each other in the folded position.

The terms and expressions which have been employed in the foregoing abstract and specification are used therein as terms of description and not of limitation, and there is no intention in the use of such terms and expressions, of excluding equivalents of the features shown and described or portions thereof, it being recognized that the scope of the invention is defined and limited only by the claims which follow.

What is claimed is:

1. A foldable step assembly adapted for mounting beneath the door of a vehicle-mounted camper to facilitate access thereto, said step assembly comprising:
   a. an upper step having an elongated support member attached at one end thereto and projecting downwardly from said upper step;
   b. a lower step having an elongated pivot arm attached at one end thereto and projecting upwardly from said lower step, its upwardly projecting end being pivotally attached to said support member to permit said lower step to pivot upwardly and downwardly with respect to said upper step about a horizontal pivot axis;
   c. stop means associated with said support member and pivot arm for limiting the arcuate distance of said downward pivotal movement of said lower step for holding said steps in an oblique, vertically spaced, unfolded position with their surfaces horizontal; and d. positive locking means associated with said support member and pivot arm for slidably interconnecting said support member and pivot arm at said pivot axis so as to permit said pivot arm to slide longitudinally downward with respect to said pivot axis automatically in response to said lower step's being pivoted upwardly into a raised, folded position above said upper step, said locking means including means for preventing further pivotal movement of said lower step and locking said lower step into place above said upper step automatically in response to said downward sliding motion of said pivot arm.

2. The step assembly of claim 1 wherein said steps include non-skid surfaces.

3. The step assembly of claim 1 wherein said upper step includes mounting means for attaching said step assembly to the vehicle.

4. The step assembly of claim 3 wherein said mounting means comprises threaded fasteners for attaching said step assembly to the rear bumper of the vehicle.

5. The step assembly of claim 1 wherein said lower step comprises blocking means for preventing the camper door from opening when said lower step is in said raised, folded position.

6. The step assembly of claim 5 wherein said blocking means comprises means attached to said lower step for projecting upwardly in front of the camper door when said lower step is in said raised, folded position.

7. The step assembly of claim 1 wherein said forward wall portion comprises said stop means.

8. The step assembly of claim 1 wherein said stop means comprises a portion projecting laterally with respect to said assembly from said support member for engaging said pivot arm.

9. The step assembly of claim 1 wherein said locking means includes means for automatically locking said lower step in said folded position by action of gravity when said step is placed in said folded position.

10. A foldable step assembly adapted for mounting beneath the door of a vehicle-mounted camper to facilitate access thereto, said step assembly comprising:
 a. a top step, a middle step, and a bottom step;
 b. a first pair of linking means disposed between said top and middle steps for pivotally interconnecting said respective steps so as to permit said middle step to pivot upwardly and downwardly with respect to said top step about a horizontal axis;
 c. a second pair of linking means disposed between said middle and bottom steps for pivotally interconnecting said respective steps so as to permit said bottom step to pivot upwardly and downwardly with respect to said middle step about a horizontal axis;
 d. geometric means associated with said first and second pairs of linking means for permitting said bottom step to be pivoted upwardly into a folded position above said middle step and for permitting said folded bottom step and said middle step to be pivoted upwardly together into a folded position above said top step with said bottom step tucked between said middle and top steps; and
 e. stop means associated with said linking means for limiting the arcuate distance of said downward pivotal movement of said middle and bottom steps for holding said steps in an oblique, vertically spaced, unfolded position with their surfaces horizontal.

11. A foldable step assembly adapted for mounting beneath the door of a vehicle-mounted camper to facilitate access thereto, said step assembly comprising:
 a. an upper step and a lower step;
 b. an L-shaped elongated support member having forward and side wall portions attached to said upper step and extending downwardly lengthwise from said upper step;
 c. a pivot axle attached to said side wall portion of said L-shaped member;
 d. an elongated pivot arm attached at its bottom end to said lower step;
 e. positive locking means for automatically locking said lower step in a raised, folded position above said upper step in response to being pivoted upwardly into said raised, folded position, said positive locking means comprising an elongated slotted opening formed in the upper end of said pivot arm in engagement with said axle for permitting said lower step to pivot upwardly and downwardly with respect to said upper step about a horizontal axis, said slot having substantially semi-circular ends and being disposed longitudinally of said arm such that the maximum distance from said upper end of said pivot arm to the center of curvature of the nearest end of said slotted opening is less than the distance from the center of said pivot axle to said forward wall portion of said L-shaped member, and the maximum distance from said upper end of said pivot arm to the center of curvature of the furthest end of said slotted opening is greater than the distance from the center of said pivot axle to said forward wall portion; and
 f. stop means associated with said support member and said arm for limiting the arcuate distance of said downward pivotal movement for holding said steps in an oblique, vertically spaced, folded position with their surfaces horizontal.

12. A foldable step assembly adapted for mounting beneath the door of a vehicle-mounted camper to facilitate access thereto, said step assembly comprising:
 a. an upper step and a lower step;
 b. a first pair of linking means disposed between said pair of steps for pivotally interconnecting said respective steps so as to permit said lower step to pivot upwardly and downwardly with respect to said upper step about a horizontal axis between a raised, folded position directly above said upper step and a downward, unfolded position vertically spaced obliquely below said upper step;
 c. stop means associated with said linking means for limiting the arcuate distance of said downward pivotal movement for holding said steps in said unfolded position with their surfaces horizontal;
 d. positive locking means for locking said lower step in said raised, folded position above said upper step;
 e. a third step below said lower step and a second set of said linking means and stop means disposed between said lower step and said third step, said first set of linking means including means for holding said lower step in a predetermined distance above the top of said upper step when said lower step is in said folded position, said predetermined distance being sufficient to permit the insertion of said third step between said upper and lower steps, said second set of linking means including means for permitting said third step to be folded upwardly together with said lower step into a position inserted between said lower and upper steps.

13. A foldable step assembly adapted for mounting beneath the door of a vehicle-mounted camper to facilitate access thereto, said step assembly comprising:
   a. an upper step and a lower step;
   b. a pair of linking means disposed between said pair of steps for pivotally interconnecting said respective steps so as to permit said lower step to pivot upwardly and downwardly with respect to said upper step about a horizontal axis;
   c. stop means associated with said linking means for limiting the arcuate distance of said downward pivotal movement for holding said steps in an oblique, vertically-spaced, unfolded position with their surfaces horizontal;
   positive locking means for locking said lower step in a raised, folded position directly above said upper step; and
   e. blocking means rigidly depending from said lower step for contacting said camper door and thereby preventing said door from opening when said lower step is in said raised, folded position.

* * * * *

UNITED STATES PATENT AND TRADEMARK OFFICE
CERTIFICATE OF CORRECTION

PATENT NO. : 3,876,230
DATED : April 8, 1975
INVENTOR(S) : Charlie E. Phillips

It is certified that error appears in the above-identified patent and that said Letters Patent are hereby corrected as shown below:

Col. 1, Line 19    A new paragraph begins with "Another".

Col. 2, Line 18    Change "located" to --locked--.

Col. 8, Line  8    Before "positive" insert --d.--.

Signed and Sealed this twenty-ninth Day of July 1975

[SEAL]

Attest:

RUTH C. MASON
Attesting Officer

C. MARSHALL DANN
Commissioner of Patents and Trademarks